(No Model.)
J. H. & S. L. G. BEDINGFIELD.
SAW GUMMER AND SHARPENER.
No. 268,070. Patented Nov. 28, 1882.
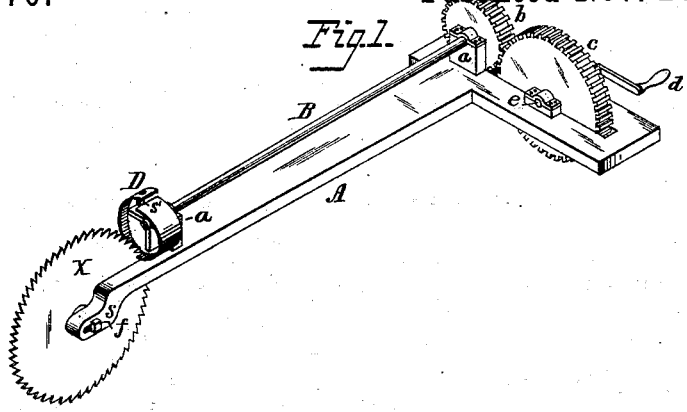
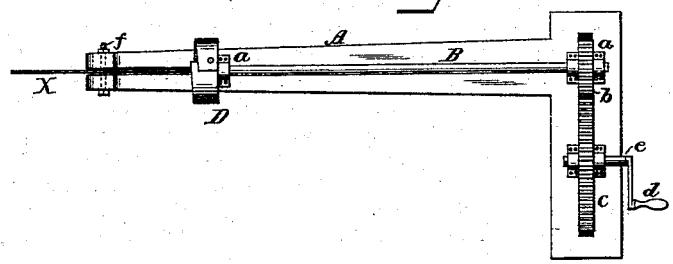
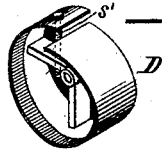
Attest:
Courtney A. Cooper
H. C. Hansmann
Inventors:
John H. Bedingfield
S. L. G. Bedingfield
By their atty
Charles E. Foster

UNITED STATES PATENT OFFICE.

JOHN H. BEDINGFIELD AND SOLOMON L. G. BEDINGFIELD, OF JUG TAVERN, GEORGIA.

SAW GUMMER AND SHARPENER.

SPECIFICATION forming part of Letters Patent No. 268,070, dated November 28, 1882.

Application filed April 19, 1882. (No model.)

*To all whom it may concern:*

Be it known that we, JOHN H. BEDINGFIELD and SOLOMON L. G. BEDINGFIELD, of Jug Tavern, Walton county, Georgia, have invented certain Improvements in Saw-Sharpening Devices, of which the following is a specification.

Our invention has for its object to gum, file, and sharpen the teeth of the saws used in cotton-gins or other like devices; and it consists in an apparatus, constructed as fully described hereinafter, whereby, after the saw is mounted in position, the teeth are successively filed without any further manipulation upon the part of the operator than that required to turn the driving-shaft.

In the drawings, Figure 1 is a perspective view, showing our improved sharpening device. Fig. 2 is a plan of Fig. 1. Fig. 3 is a perspective view, showing the cutter-tool; and Fig. 4 is a view of the cutter-blade extended.

The frame A is made in any suitable form to support the operating appliances hereinafter described, and has bearings $a$ for a shaft, B, carrying a pinion, $b$, which gears with a cog-wheel, $c$, mounted upon a driving-shaft, $e$, provided with a crank-handle, $d$. The frame A is split or divided at one end to form a slot to receive the saw or blade, X, the teeth of which are to be gummed or sharpened, the said blade being suspended upon a mandrel, $f$, passing through arms $s\ s$, with or upon which mandrel the blade will turn freely.

Upon the end of the shaft B is a cutting-tool, D, which consists of a flat blade, wider at one end than the other, bent to a spiral form, as shown in Fig. 3, the rear edges of the spirals on the same plane, and at the front of the cutter-blade, as well as on one side, according as the backs or throats of the teeth are to be cut, is a file-surface. The cutter is mounted upon a cross-bar secured to the end of the shaft B. Thus constructed and arranged, as shown in the drawings, the revolution of the shaft B will cause the cutter to traverse the edge of the tooth and rapidly reduce the same, while at the same time, owing to the spiral form of the cutter, the disk or saw is turned, so that at the next revolution of the cutter its edge will be brought to act upon the next tooth, the increasing width of the blade from the end to the center carrying the cutting-edge deeper into the throat as the operation progresses. In this way the teeth are acted upon in rapid succession without further manipulation than is requisite to set the saw and turn the handle $d$.

The bearing-pin $f$ may be adjustable, so as to properly present saws of different sizes to the cutter. The cutter may be secured to the shaft B in any suitable manner, and a screw, $s'$, or other adjusting appliance, may be used, so as to set the outer end at any required distance from the center line or axis of the shaft, regulating the spread of the spiral in proportion to the distance between the teeth to be operated upon.

Other appliances may be used for imparting the revolving motion to the shaft and its cutter.

We claim—

1. A machine for gumming and sharpening saws, provided with a cutter consisting of a blade bent to a spiral form and having a sharpening-surface, a shaft supporting the said blade, a support for the saw, and appliances for revolving the shaft, substantially as specified.

2. The combination, with the shaft B and saw-support, of a cutter-blade bent to a spiral form, widest at the inner end, and with the inner edge of the spiral coils on the same vertical plane, substantially as set forth.

3. The combination, with the spiral cutter mounted upon the end of a longitudinal shaft, of a device for spreading and contracting the cutter, substantially as set forth.

In testimony whereof we have signed our names to this specification in the presence of two subscribing witnesses.

JOHN H. BEDINGFIELD.
SOLOMON L. G. BEDINGFIELD.

Witnesses:
WM. H. GOODWIN,
JOHN P. EDWARDS.